(12) United States Patent
Brazier et al.

(10) Patent No.: US 6,491,055 B2
(45) Date of Patent: Dec. 10, 2002

(54) PRESSURE RELIEF APPARATUS

(75) Inventors: Geof Brazier, Tulsa, OK (US); Arthur Dubbeldam, Ardrossan (CA); Peter Dubbeldam, Ardrossan (CA); Michael Hitz, Tulsa, OK (US)

(73) Assignee: BS&B Safety Systems, Inc., Tulsa, OK (US)

( * ) Notice: Subject to any disclaimer, the term of this patent is extended or adjusted under 35 U.S.C. 154(b) by 0 days.

(21) Appl. No.: 09/961,342

(22) Filed: Sep. 25, 2001

(65) Prior Publication Data

US 2002/0007848 A1 Jan. 24, 2002

Related U.S. Application Data

(62) Division of application No. 09/863,414, filed on May 24, 2001, which is a division of application No. 09/478,494, filed on Jan. 6, 2000.

(51) Int. Cl.[7] ............................................. F16K 31/64
(52) U.S. Cl. ............................... 137/76; 137/70; 137/72
(58) Field of Search ........................... 137/68.11, 68.12, 137/70, 72, 74, 75, 76, 79, 80; 251/304, 305, 306

(56) References Cited

U.S. PATENT DOCUMENTS

| 1,292,603 | A | * | 1/1919 | Hohman | 137/76 |
| 2,181,523 | A | * | 11/1939 | Shiels | 137/76 |
| 2,426,808 | A | * | 9/1947 | Auer | 137/72 |
| 2,508,231 | A | * | 5/1950 | De Frees | 137/68.12 |
| 3,038,485 | A | | 6/1962 | Hosek | |
| 3,077,331 | A | | 2/1963 | Burtis | |
| 3,275,012 | A | * | 9/1966 | Howard et al. | 137/76 |
| 3,528,448 | A | | 9/1970 | Urban | |
| 3,863,720 | A | * | 2/1975 | Young | 137/73 |
| 3,941,151 | A | | 3/1976 | Biddle | |

(List continued on next page.)

FOREIGN PATENT DOCUMENTS

| EP | 0 829 665 A1 | 3/1998 |
| FR | 1 459 171 | 2/1967 |
| GB | 2 033 054 | 5/1980 |
| GB | 2 103 926 A | 3/1983 |

OTHER PUBLICATIONS

ADAMS, Product Sheet, "Built to Meet Critical Requirements" (1 page).
Advance Valve Technologies: Product Sheet (1 page).
Check Rite® Fusible Link Valves, Ritepro Inc., 1995 (2 pages).
International Search Report, dated May 7, 2001 (5 pages).
Retsco Style C Tilting Disc Wafer Check Valve, Features, Description and Specifications (4 pages).

*Primary Examiner*—Michael Powell Buiz
*Assistant Examiner*—Ramesh Krishnamurthy
(74) *Attorney, Agent, or Firm*—Finnegan, Henderson, Farabow, Garrett & Dunner, L. L. P.

(57) ABSTRACT

A pressure relief apparatus includes a valve having a body. A shaft is rotatably disposed in the body and has an exterior end extending through the body. A plug, which may contain an internal passageway, is mounted on the shaft and is disposed in the fluid flowpath. The body is engageable with the system to expose the plug to the pressurized fluid so that the pressurized fluid acts on the plug to exert a torque on the shaft which is offset from the center line of the plug. The apparatus further includes a linkage assembly configured to translate the torque exerted on the shaft into an output force. A release device, such as a buckling pin or a magnet, is connected to the linkage assembly and is configured to release the shaft when the output force exceeds a predetermined limit. Preferably, the linkage assembly is adjustable to vary the magnitude of the output force corresponding to a given torque. A low torque seal secured in place by a retaining ring is disposed in the body to prevent fluid from leaking through the body past the plug.

8 Claims, 9 Drawing Sheets

U.S. PATENT DOCUMENTS

| | | |
|---|---|---|
| 4,192,484 A | 3/1980 | Scaramucci |
| 4,209,037 A | 6/1980 | Upham |
| 4,227,675 A | 10/1980 | Sutter et al. |
| 4,228,816 A | 10/1980 | Aoki |
| 4,310,012 A | 1/1982 | Billington et al. |
| 4,745,940 A * | 5/1988 | Ely ............................ 137/73 |
| 4,856,547 A | 8/1989 | Solaroli |
| 4,896,690 A * | 1/1990 | Taylor .......................... 137/80 |
| 4,969,482 A * | 11/1990 | Perrin et al. ................... 137/76 |
| 5,144,973 A * | 9/1992 | Green et al. ................... 137/76 |
| 5,607,140 A | 3/1997 | Short, III et al. |
| 5,647,390 A * | 7/1997 | Wass ....................... 137/68.12 |
| 5,947,445 A | 9/1999 | Wang et al. |
| 6,296,808 B1 * | 10/2001 | Pearman ...................... 137/76 |

\* cited by examiner

PRESSURE RELIEF APPARATUS

This is a division of application Ser. No. 09/863,414, filed May 24, 2001, which is a divisional of Ser. No. 09/478,494, filed Jan. 6, 2000 which is incorporated herein by reference.

BACKGROUND OF THE INVENTION

This invention generally relates to systems for relieving pressure from a pressurized system. More particularly, the present invention relates to a pressure relief apparatus for a system containing a pressurized fluid.

There are many types of systems that process or use a pressurized fluid. To ensure the safety of these types of systems, each such system typically includes a safety device designed to prevent the over-pressurization of the system. In an emergency situation, where the fluid in the system reaches an unsafe level, the high pressure of the fluid acts on the safety device to create an opening to release fluid from the system. Venting fluid to the environment or a safety reservoir through the opening reduces the pressure in the system and prevents another portion of the system from failing due to the high pressure of the fluid.

Examples of commonly used safety devices include rupture disks and explosion panels. These safety devices can be attached to a pressurized system to expose a certain portion of the device to the pressurized fluid in the system. The portion of the device exposed to the fluid is configured to rupture or tear when the fluid reaches a predetermined pressure. The tearing or rupture of the disk or panel creates an opening through which the pressurized fluid flows to reduce the pressure in the system. This type of safety device is, therefore, self-destructing and must be replaced after each use. Typically, to replace one of these safety devices, some disassembly of the system is needed so that the disk or panel can be properly engaged with the system.

Another type of safety device for a pressurized system is a pressure relief valve, which may be a reclosing valve or a non-reclosing valve. Typically, a spring, a pin, or a combination of a spring and pin, is used to hold a moving plug in sealing engagement with the housing of the device while connected to the pressurized system. When the pressure of the fluid reaches the predetermined safety level in such systems, the force exerted on the plug by the pressurized fluid overcomes the bias of the spring or exceeds the resistance of the pin that holds the plug in place. When either of these events occurs, the pressurized fluid moves the plug to expose an opening through which fluid may escape to relieve the pressure in the system. Reclosing valves will automatically reset once the pressurized fluid at the inlet of the device has reduced sufficiently for the spring or other mechanism to reseat the plug. Non-reclosing valves require that the device be manually reset so that the valve plug is re-engaged with the seal and, if necessary, the pin or other expendable component replaced.

A valve disposed in a pressurized system will often include a strong seal between the body and the plug to limit or prevent fluid from leaking through the valve. One type of seal is a broad band seal (as opposed to a line seal), where a significant area of the typically flexible seal engages a large portion of the plug. As a result, a correspondingly large force is required to break the seal, and the force required to break the seal tends to increase the longer the seal remains engaged with the plug. A valve using this type of seal is not well adapted for low pressure applications, where the force of the fluid may not be capable of breaking the seal. Further, these valves require a large force to seat the seal, which can interfere with the accuracy of the set pressure of the device. In addition, the seals of these valves are located in positions that require extensive disassembly of the valve in the field, which makes seal replacement difficult and can affect the accuracy of the device.

A common type of pressure relief valve is a rotatable valve assembly. A rotatable valve includes a plug that is mounted on a rotatable shaft and may be rotated between a closed position where the plug blocks the flow of fluid and an open position where the plug allows fluid to flow through the valve. The rotation of the plug to the open position may be initiated manually or by another external force. Alternatively, the plug may be mounted on the shaft so that the rotational axis of the plug is offset relative to the center of the plug, so that the pressurized fluid exerts a torque on the shaft and urges the plug to rotate. A device may be coupled to the shaft to prevent the shaft from rotating until the torque on the shaft reaches a certain level, indicating that the pressure of the fluid has reached an over-pressure situation. At that point, the shaft is released and the plug rotates to open the valve and vent the system.

However, the components of these rotatable valve assemblies are specifically designed to provide pressure relief for a specific pressure or narrow pressure ranges. To operate at a range of set pressures, the rotatable valve assembly would require modification of some or all component parts to vary the distance by which the rotational axis of the plug is offset from the center of the shaft. This limits the use of such assemblies in the field and creates inventory problems for valve manufacturers. Moreover, the inability to standardize parts for broad pressure ranges increases the cost of manufacturing the devices.

Another problem with rotatable valve assemblies is that the rotation of the plug does not move the plug out of the fluid flowpath and, thus, the plug obstructs the flow of the venting fluid. The object of the pressure relief device is to quickly reduce the pressure of the system and significant blockage of the fluid flow is undesirable. A low flow resistance factor (Kr) or high coefficient of discharge (Kd) is required. The presently known valve assemblies have the disadvantage of impeding fluid flow in relieving an over pressure situation.

In light of the foregoing, there is a need for a pressure relief apparatus that (1) can be calibrated to provide pressure relief over a wide range of pressures while utilizing standard parts, (2) provides a large flowpath for fluid to vent, (3) has an improved seal in both its working design and for purposes of field replacement, and (4) may be used in low pressure systems as well as high pressure systems.

SUMMARY OF THE INVENTION

Accordingly, the present invention is directed to a pressure relief apparatus that obviates one or more of the limitations and disadvantages of prior art pressure relief devices. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a pressure relief apparatus for a system containing a pressurized fluid. The pressure relief apparatus includes a valve having a body that defines a fluid flowpath. A shaft is rotatably disposed in the body and has an exterior end that extends through the body. A plug is mounted on the shaft. The body is engageable with the system to expose the plug to the pressurized fluid. The pressurized fluid acts on the plug to exert a torque on the shaft and rotate the plug from a closed position to an open position. A linkage assembly is engageable with the exterior end of the shaft and is configured to translate the torque exerted on the shaft into an output force. The linkage assembly is adjustable to vary the magnitude of the output force corresponding to a particular shaft torque. A release device is connected to the linkage assembly to prevent the shaft from rotating until the output force exceeds a predetermined limit.

In another aspect, the invention is directed to a pressure relief apparatus for a system containing a pressurized fluid. The pressure relief apparatus includes a valve having a body that defines a fluid flowpath. A shaft is rotatably disposed in the body and has an exterior end that extends through the body. A plug is mounted on the shaft. The body is engageable with the system to expose the plug to the pressurized fluid, which exerts a torque on the shaft to rotate the plug from a closed position to an open position. A linkage assembly is engageable with the exterior end of the shaft and is configured to generate an output force based upon the torque exerted on the shaft. A pin including a weakened area is operatively connected to the linkage assembly such that the output force acts to compress the pin. The weakened area of the pin causes the pin to buckle when the output force exerted thereon reaches a predetermined level. The buckling of the pin allows the plug to rotate to the open position.

In yet another aspect, the present invention is directed to a linkage assembly for a rotatable valve assembly. The valve assembly has a release device and a plug mounted on a rotatable shaft. The valve assembly is engageable with a pressurized system to expose the plug to pressurized fluid that acts on the plug to rotate the plug and shaft. The linkage assembly includes an input arm connected to the shaft of the rotatable valve assembly, a trigger operatively connected to the input arm such that the torque exerted on the shaft is translated into a substantially linear force, a fulcrum, and a lever arm supported by the fulcrum. The lever arm has a first end operatively coupled with the trigger and a second end coupled with the release device. The substantially linear force acts on the first end of the lever arm to pivot the lever arm about the fulcrum and generate an output force between the second end of the lever arm and the release device. The release device is configured to release the lever arm and thereby allow the shaft to rotate when the output force exceeds a predetermined limit.

In another aspect, the present invention is directed to a pressure relief apparatus for a system containing a pressurized fluid. The pressure relief apparatus includes a valve having a body that defines a fluid flowpath. A shaft is rotatably disposed in the body and has an exterior end that extends through the body. A plug is mounted on the shaft. The body is engageable with the system to expose the plug to the pressurized fluid, which acts on the plug to exert a torque on the shaft to rotate the plug from a closed position to an open position. A linkage assembly is engageable with the exterior end of the shaft. The linkage assembly is configured to translate the torque exerted on the shaft into an output force. A release device is operatively connected to the linkage assembly to prevent the shaft from rotating until the output force exceeds a predetermined limit. A latch is configured to engage the linkage assembly when the plug rotates to the open position to hold the plug in the open position.

In still another aspect, the present invention is directed to a pressure relief apparatus for a system containing a pressurized fluid. The pressure relief apparatus includes a body that defines a fluid flowpath. A shaft is rotatably disposed in the body and has an exterior end that extends through the body. A plug is mounted on the shaft. The body is engageable with the system to expose the plug to the pressurized fluid, which exerts a torque on the shaft to rotate the plug from a closed position to an open position. A linkage assembly is engageable with the exterior end of the shaft and is configured to translate the torque exerted on the shaft into an output force. A release device is operatively connected to the linkage assembly to prevent the shaft from rotating. The release device includes a fusible alloy configured to liquefy and allow the shaft to rotate when the temperature of the alloy exceeds a predetermined limit.

According to still another aspect, the present invention is directed to a pressure relief apparatus for a system containing a pressurized fluid. The pressure relief assembly includes a valve having a body that defines a fluid flowpath. A shaft is rotatably disposed in the body and a plug is mounted on the shaft. The body is engageable with the system to expose the plug to the pressurized fluid. The plug and shaft are rotatable between a closed position where the plug prevents pressurized fluid from flowing through the fluid flowpath in the body and an open position where pressurized fluid flows between the body and the plug. A seal is disposed in the body and is configured to engage the plug when the plug is in the closed position to prevent pressurized fluid from flowing between the plug and body when the plug is in the closed position. A retaining ring is provided to engage the body and is configured to retain the seal in the body. The retaining ring may be disengaged from the body while the shaft and plug remain intact within the body.

According to yet another aspect, the present invention is directed to a pressure relief apparatus for a system containing a pressurized fluid. The pressure relief assembly includes a body that defines a fluid flowpath and includes an inner surface that has a curved shape. The body is engageable with the pressurized system to direct pressurized fluid into the fluid flowpath. A shaft is rotatably disposed in the body. A plug is mounted on the shaft and disposed in the fluid flowpath. The outer perimeter of the plug has a curved cross section that is generally complimentary to the shape of the inner surface of the body. The plug and shaft are rotatable between a closed position where the plug prevents pressurized fluid from flowing through the fluid flowpath in the body and an open position where pressurized fluid flows between the body and the plug. A seal is disposed in the body. The seal is configured to provide a line seal that is engageable with a portion of the outer perimeter of the plug to prevent pressurized fluid from flowing between the plug and the body. The seal is engageable with the plug for between about 1.5° and 5° of rotation of the plug.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

FIG. 6b is an exploded assembly view of the linkage assembly of FIG. 6a;

DETAILED DESCRIPTION

Reference will now be made in detail to the presently preferred embodiment of the present invention, an example of which is illustrated in the accompanying drawings. Wherever possible, the same reference numbers will be used throughout the drawings to refer to the same or like parts. An exemplary embodiment of a pressure relief apparatus of the present invention is shown in FIG. 1 and is designated generally by reference number 20.

In accordance with the present invention, there is provided a pressure relief apparatus for a system containing a pressurized fluid. The pressure relief apparatus includes a valve having a body that defines a fluid flowpath. The body is engageable with the pressurized system to direct pressurized fluid through the flowpath. Preferably, the body includes a flange that has a series of bolt holes corresponding to the standard bolt pattern on a pipe flange to allow the body to be easily engaged with the pressurized system. However, the present invention contemplates that the pressure relief apparatus of present invention may be engaged with the pressurized system in any other manner readily apparent to one skilled in the art.

Figure 1:
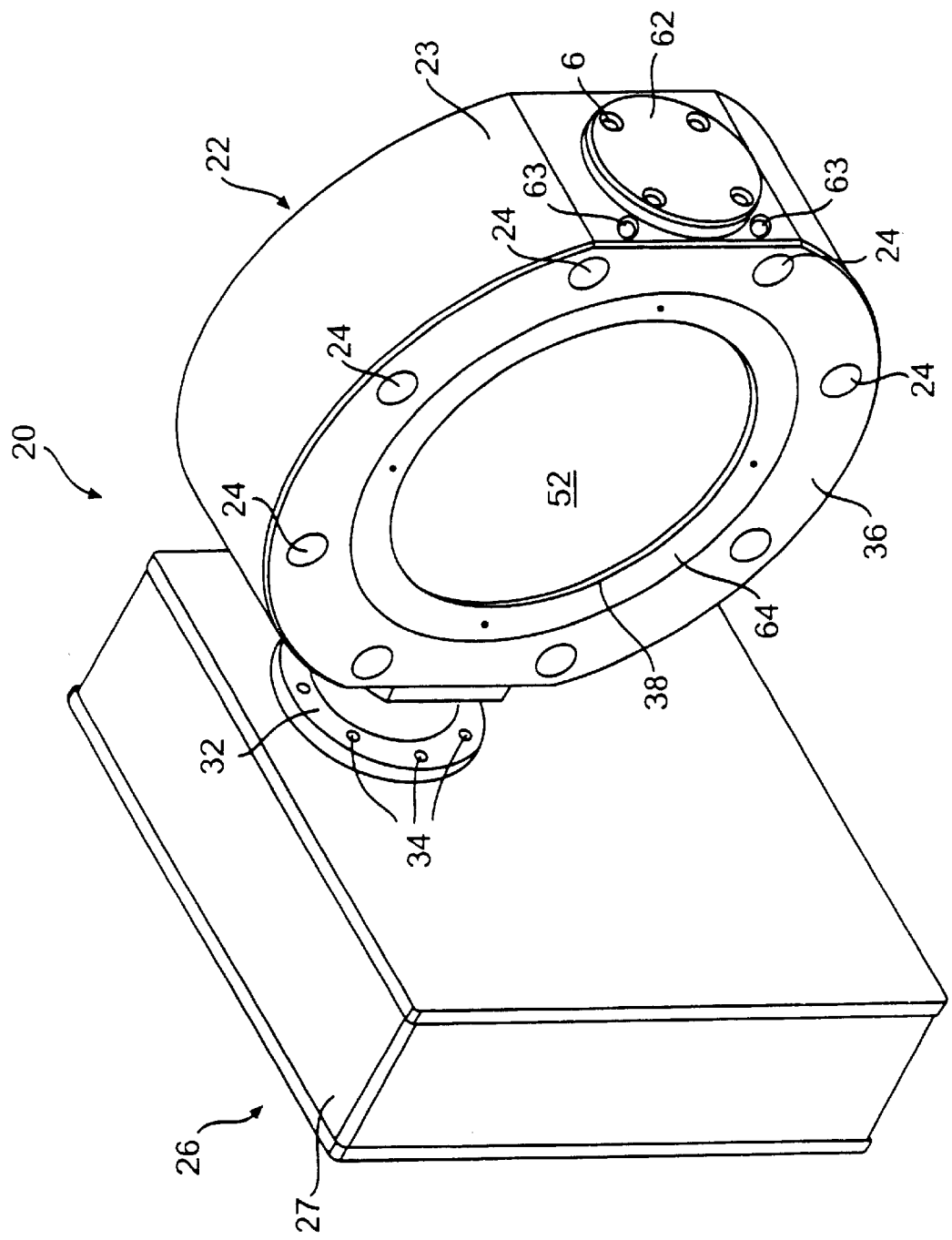
FIG. 1 is a perspective view of a pressure relief apparatus for a pressurized system according to the present invention.

As embodied herein and as illustrated in FIG. 1, a pressure relief apparatus 20 includes a valve 22 having a body 23. Body 23 has a flange 36 that contains a series of bolt holes 24. Preferably, bolt holes 24 are positioned in flange 36 to conform to the standard ANSI bolt pattern (or other standardized bolt pattern) for a pipe flange with a similar nominal size. Bolts, or other connecting devices, may be used to engage flange 36 with a corresponding pipe flange that is connected to a pressurized system (not shown). The structure of the present invention allows for utilization of the entire ANSI standard bolt pattern when installing the valve and is, therefore, preferable over prior art designs wherein this was not practical (due to the magnitude of the rotating mechanism).

Figure 2:
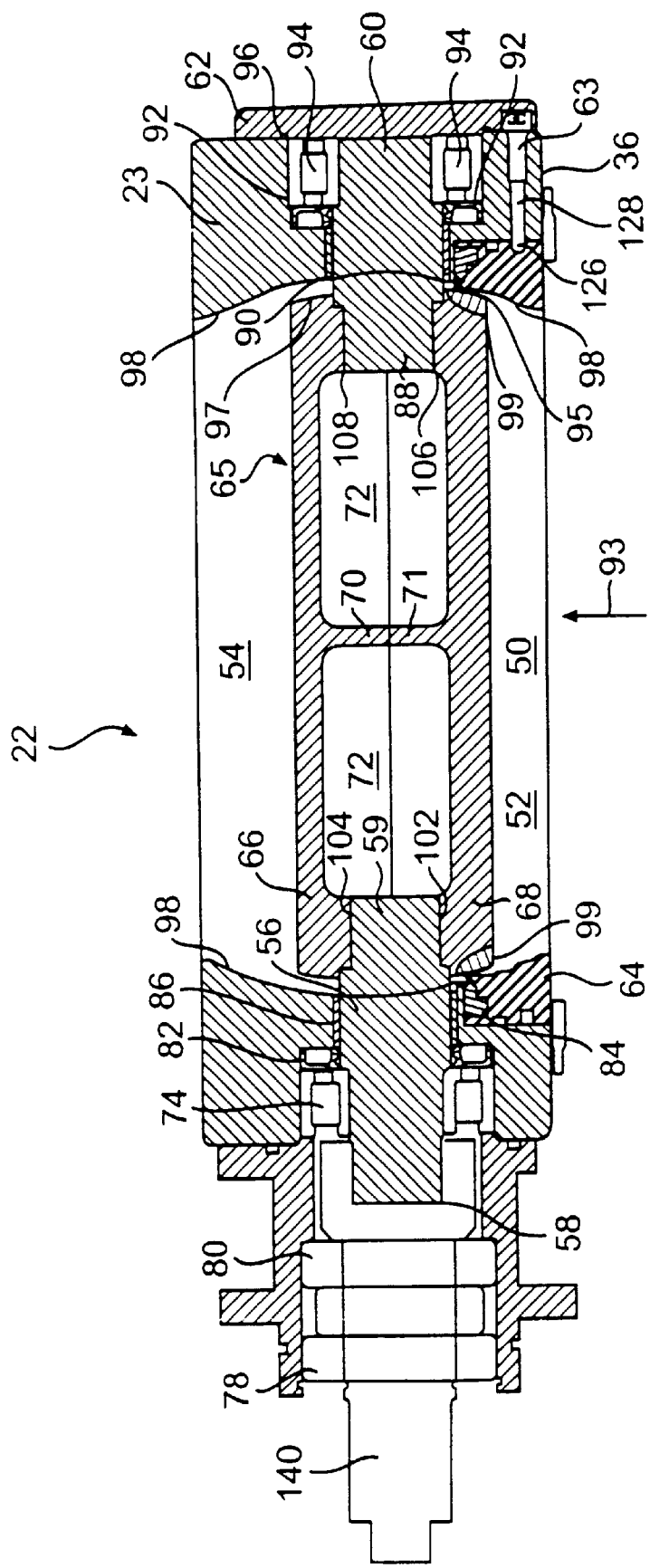
FIG. 2 is a cross-sectional view of a valve according to the present invention, illustrating a plug in a closed position.

As illustrated in FIG. 2, body 23 includes an inner surface 98 that defines a fluid flowpath 50 having an inlet 52 and an outlet 54. Preferably, inner surface 98 of body 23 has a spherical or curved shape. When flange 36 is engaged with a pipe flange of a pressurized system, the system pipe flange guides pressurized fluid in the direction indicated by arrow 93 and into body 23, which directs the pressurized fluid into inlet 52.

In accordance with the present invention, the valve may include a shaft rotatably mounted in the body and a plug disposed in the fluid flowpath. The plug is mounted on the shaft and is rotatable between a closed position, where the plug prevents pressurized fluid from flowing through the fluid flowpath, and an open position, where pressurized fluid is allowed to flow through the fluid flowpath. In the illustrated embodiment, the plug is mounted on the shaft in an offset manner such that when the plug is in the closed position, the pressurized fluid acts on the plug to exert a torque on the shaft to rotate the plug from the closed position to the open position.

As illustrated in FIG. 2, a shaft 56 is rotatably mounted in body 23. Shaft 56 includes an exterior end 58 that extends through body 23 and an interior end 59 that extends into the plug. As shown in greater detail in FIG. 3, a bearing, such as roller bearing 74 or a bushing, is positioned between shaft 56 and body 23 to facilitate rotation of the shaft within body 23.

Figure 3:
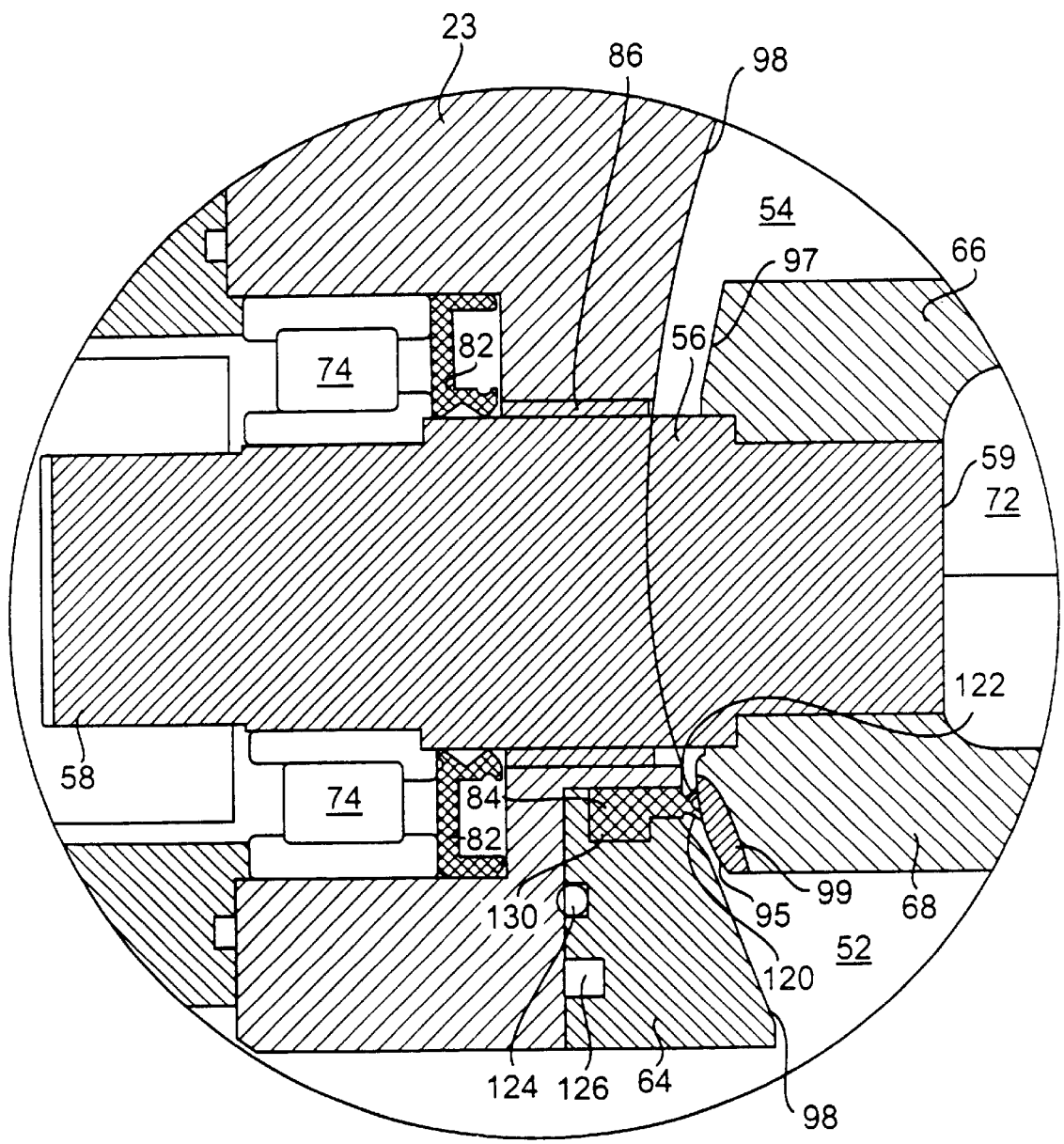
FIG. 3 is a partial cross-sectional view of the valve of FIG. 2, illustrating a shaft and a seal in accordance with the present invention.

As is also illustrated in FIG. 3, a seal 82 is disposed between shaft 56 and body 23. Seal 82 prevents pressurized fluid from escaping the valve between the surfaces of the shaft and the body. Preferably, as shown in FIG. 2, a bushing 86 is disposed in body 23. The inner diameter of bushing 86 is sized to closely correspond to the outer diameter of shaft 56.

Referring again to FIG. 2, a second shaft 60 is rotatably mounted in body 23 opposite shaft 56. As with shaft 56, shaft 60 includes an interior end 88 extending into fluid flowpath 50 and a bearing, such as roller bearing 94 or a bushing, is positioned between shaft 60 and body 23 to facilitate rotation of shaft 60 within body 23.

A seal 92 is also disposed between shaft 60 and body 23. Seal 92 prevents pressurized fluid from escaping the valve between the surfaces of shaft 60 and body 23. Preferably, a bushing 90 is disposed in body 23. The inner diameter of bushing 90 is sized to closely correspond to the outer diameter of shaft 60.

A cover plate 62 is connected to body 23 to prevent shaft 60 from sliding with respect to the body. An o-ring 96 is positioned between cover plate 62 and body 23. O-ring 96 creates a seal between the body 23 and cover plate 62 to prevent any ingress of foreign matter between the shaft and bearing.

As is also shown in FIG. 2, a plug 65 is disposed within fluid flowpath 50. Preferably, plug 65 includes opposing sides with an internal passageway therebetween. In a preferred embodiment, the plug includes an inlet plate 68 and an outlet plate 66 that are joined together. Inlet plate 68 includes an outer perimeter 95 and outlet plate 66 includes an outer perimeter 97. Preferably, outer perimeters 95 and 97 of the inlet and outlet plates have a curved cross-sectional shape that generally conforms to the contour of inner surface 98 of body 23. The present invention contemplates, however, that inner surface 98 of body 23 may form a straight bore on one or more sides. In addition, the plug may have alternative configurations, including a single plate design or a multiple plate design.

Figure 4:
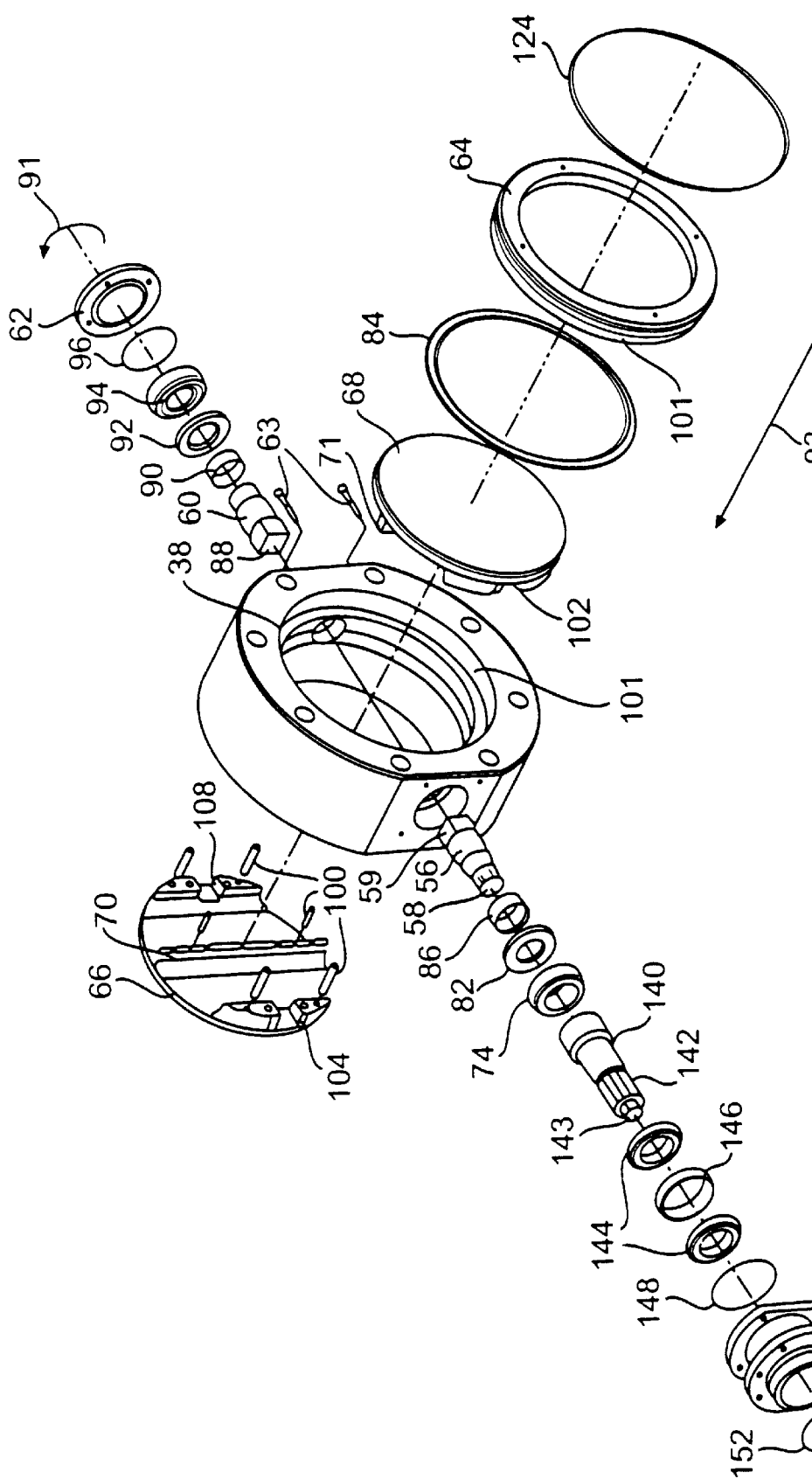
FIG. 4 is an exploded view of a valve according to the present invention.

Inlet plate 68 also includes a central projection 71 and outlet plate 66 includes a corresponding projection 70. Preferably, as illustrated in FIG. 4, a series of posts 100 are positioned between the inlet and outlet plates. Posts 100 engage corresponding openings in the inlet and outlet plates to ensure that the plates are properly aligned. Central projections 70 and 71 align to form a crossbar that defines fluid passageways 72. The present invention contemplates that the inlet plate and outlet plate may be cast as a single part that defines one or more fluid passageways therebetween.

As shown in FIG. 2 and discussed previously, plug 65 is mounted on shafts 56 and 60. Because shafts 56 and 60 are rotatably mounted in body 23, plug 65 is similarly rotatable with respect to body 23. Plug 65 may be rotated between a closed position, where the plug is substantially perpendicular to the direction of fluid flow, and an open position, where the plug is substantially parallel to the direction of fluid flow (as indicated by arrow 93 in FIGS. 2 and 4).

The present invention contemplates that the described pressure relief apparatus may be used as a reclosing pressure relief device or a non-reclosing pressure relief device. In the non-reclosing embodiment, the plug 65 rotates through approximately 90° in moving from the closed position to the open position. This places the inlet and outlet plates substantially parallel to the direction of fluid flow (as indicated by arrow 93 in FIGS. 2 and 4) to afford the highest fluid flow rate to most efficiently reduce the pressure within the system. In the reclosing, embodiment, the plug 65 rotates through approximately 85° in moving from the closed position to the fully open position. In this position, the inlet and outlet plates are positioned such that the fluid continues to exert a force on the plug. When the pressure of the fluid, and the resultant force on the plug, drop below a certain limit, a spring or other similar mechanism will rotate the plug back to the closed position. Preferably, plug 65 is configured to ensure the flow resistance factor (Kr) of the open valve is less than approximately 6.0.

A position indicator (not shown) may be attached to shaft 60. Preferably, the position indicator either extends through or is visible through cover plate 62. The location of the position indicator will indicate whether the plug is in the open position or in the closed position.

Preferably, as shown in FIG. 4, interior ends 59 and 88 of shafts 56 and 60, respectively, have a square shape and inlet plate 68 and outlet plate 66 each include a pair of notches 102, 104, 106, and 108 (referring to FIGS. 2 and 4). When inlet plate 68 is attached to outlet plate 66, notches 102 and 104 combine to engage interior end 59 of shaft 56 and notches 106 and 108 combine to engage interior end 88 of shaft 60.

The rotational axis of plug 65 is determined by the location of notches 102, 104, 106, and 108. Preferably, these notches are disposed so that the rotational axis of the plug 65 is displaced from the centerline of the plug. This offset mounting of the plug results in a greater portion of inlet plate 68 located on one side of the rotational axis than on the other side of the rotational axis. The force exerted on the inlet plate by the pressurized fluid is equal to the pressure of the fluid times the area of the plate. Since a larger area of the plate is positioned on one side of the rotational axis, the resultant force of the pressurized fluid will create a moment arm about the rotational axis that acts to rotate plug 65 in the direction indicated by arrow 91 (referring to FIG. 4) and exert a torque on shafts 56 and 60. Thus, the amount of the displacement of the rotational axis of the plug from the centerline of the plug and the pressure of the fluid will determine the amount of torque exerted on the shaft. The present invention contemplates that shafts 56 and 60 may be disposed in housing 23 to position the rotational axis of the plug at any location from the centerline of the plug (0% offset) to the perimeter of the plug (100% offset).

As illustrated in FIG. 4, a spindle 140 having a spline 142 is engageable with exterior end 58 of shaft 56. Exterior end 58 of shaft 56 includes a series of notches and ridges and spindle 140 includes complimentary openings configured to receive the notches and grooves of the exterior end. The notches and grooves ensure that shaft 56 and spindle 140 are solidly coupled so that any rotation of shaft 56 is translated to a corresponding rotation of spindle 140.

Spindle 140 is rotatably mounted within a spindle housing 150 that is engagaeable with body 23. When spindle housing 150 is mounted on body 23, spline 142 extends outside of spindle housing 150. In addition, engagement of spindle housing 150 with body 23 prevents spindle 140 from disengaging exterior end 58 of shaft 56. A pair of bearings 144, which are separated by a spacer 146, support spindle 140 and allow the spindle to be easily rotated within spindle housing 150. Preferably, an o-ring 148 is placed between spindle housing 150 and body 23 to prevent ingress of foreign matter between shaft 56 and bearings 144.

Preferably, spline 142 also includes a drive 143. Preferably drive 143 is hexagonal such that a standard wrench or socket may be engaged with drive 143 to rotate spindle 140 and, thus, shaft 56 and plug 65. In this manner, plug 65 may be manually rotated from the open position to the closed position to reset the pressure relief apparatus.

In accordance with the present invention, a seal is disposed in the body. The seal is configured to provide a line seal engageable with a portion of the outer perimeter of the plug to prevent pressurized fluid from flowing between the plug and the body. Preferably, the seal engages the plug for between about 1.5° and 5° of rotation of the plug between the closed position and the open position. The use of a line seal with the globed or spherical surface results in a low torque valve that is more readily opened and reclosed. As such, the valve is useful in low pressure applications. This is particularly true with a hollow plug that reduces the mass that is moved between the open and closed positions.

As illustrated in FIG. 3, a seal 84 is disposed in body 23. Seal 84 extends around the circumference of inner surface 98 of body 23. Preferably, seal 84 is made of a soft, elastic material, such as VITON.

In the illustrated embodiment, seal 84 includes two projections 120 and 122 that extend divergently from body 23 and are configured to engage a portion of the outer perimeter of inlet plate 68 around the entire circumference of the inlet plate. The present invention contemplates, however, that the seal may be positioned adjacent the outlet plate so that projections 120 and 122 engage a portion of the outer perimeter of outlet plate 66. Alternatively, two seals may be disposed in body 23, one configured to form a seal with the inlet plate and the other configured to form a seal with the outlet plate.

Projection 120 extends from body 23 to outer perimeter 95 of inlet plate 68 and is angled towards housing inlet 52. Because the outer perimeter 95 of inlet plate 68 is curved, projection 120 will remain in contact with the outer perimeter and maintain the seal until plug 65 rotates through the first portion of the rotation from the closed position to the open position. Preferably, projection 120 remains in contact with the outer perimeter of the inlet plate for between about 1.5° and 5° of rotation of the plug.

As illustrated in FIGS. 2 and 3, a replaceable seat 99 is preferably disposed on the outer edge of inlet plate 68. Seat 99 may be constructed of metal, preferably of the same material as inlet plate 68, or seat 99 may be a soft seat, preferably constructed of the same material as seal 84. It is contemplated that outer perimeter 95 of replaceable seat 99 may include a coating, such as TEFLON, to reduce the friction between the seal and the plug and allow the plug to more freely open in low pressure applications.

As discussed, the curved surface of outer perimeter 95 of inlet plate 68 allows the seal to be easily energized and allows for a low-torque engagement of projection 120 with inlet plate 68. The angle of projection 120 also allows pressurized fluid from the inlet side of the device to contact projection 120 and exert a force to increase the performance of the seal.

In addition, the low energy seal and the simple offset design of the plug allow the valve to be connected to the pressurized system in an orientation that will allow gravity to act on the plug to reclose the valve after the pressure in the system has been relieved. Alternatively, the valve may be gravity balanced so that the valve device may be installed in any orientation, such as horizontally, vertically, or obliquely, and the weight of the device will not influence the set pressure.

Seal projection 122 extends from body 23 to outer perimeter 95 of inlet plate 68 and is angled towards body outlet 54. Projection 122 will hold back pressure, such as would be created by a vacuum from inlet side 52 or a fluid pressure on outlet side 54. Alternatively, a separate seal may be disposed in body 23 and configured to engage outlet plate 66 to hold back pressure.

As illustrated in FIG. 4, a retaining ring 64 is engageable with body 23 to hold seal 84 in place. Preferably, body 23 and retaining ring 64 are configured so that retaining ring 64 may be engaged with body 23 with a press-fit. The present invention contemplates that the retaining ring may be engaged with the body by other methods, such as, for example, corresponding threads on the retaining ring and body.

As illustrated in FIG. 3, retaining ring 64 includes a notch 130 having substantially the same shape as seal 84. The mating surfaces of the retaining ring 64 and body 23 are configured to ensure that retaining ring 64 contacts body 23 before the retaining ring over compresses seal 84. In addition, an o-ring 124 may be disposed between retaining ring 64 and body 23 to prevent any undesirable leakage of fluid from the valve and to retain the body and retaining ring together.

In the illustrated embodiment, the retaining ring engages the inlet side of the valve body. This configuration is preferred because it provides for easy replacement of the seal in the field. To replace the seal, the valve is disassembled only as far as necessary to provide access to the retaining ring. The retaining ring is then removed from the body, while leaving the plug and shaft assembly intact. Removing the retaining ring exposes the seal and allows the used seal to be replaced with a new seal. While this is the preferred embodiment of the retaining ring, it is contemplated that the retaining ring could engage the outlet side of the body to hold the seal in place.

As illustrated in FIG. 2, retaining ring 64 preferably includes a groove 126 in its outer edge. Body 23 includes bolt holes 128 configured to align with groove 126 when retaining ring 64 is fully seated in body 23. Bolts 63 (referring to FIG. 4) engage bolt holes 128 and extend into groove 126. The engagement of bolts 63 with groove 126 prevents retaining ring 64 from any lateral movement during operation of the valve, thereby ensuring that the seal will remain engaged with the inlet plate.

In addition, these bolts allow the main plug to be sealed, with wire or another closure, according to ASME practices.

The applicable ASME code sections require that removable pressure containing parts be sealed with a closure, preferably lead, to provide evidence of tampering or alteration from "as built" condition. The present invention contemplates that such a lead closure may be placed on these bolts.

In accordance with the present invention, a linkage assembly is provided. The linkage assembly is engageable with the exterior end of the shaft to translate the torque exerted on the shaft into an output force. The present invention contemplates many linkage assemblies of many different configurations. Preferably, the linkage assembly is adjustable during set pressure calibration of the device to vary the magnitude of the output force that corresponds to a particular shaft torque.

Figure 5:
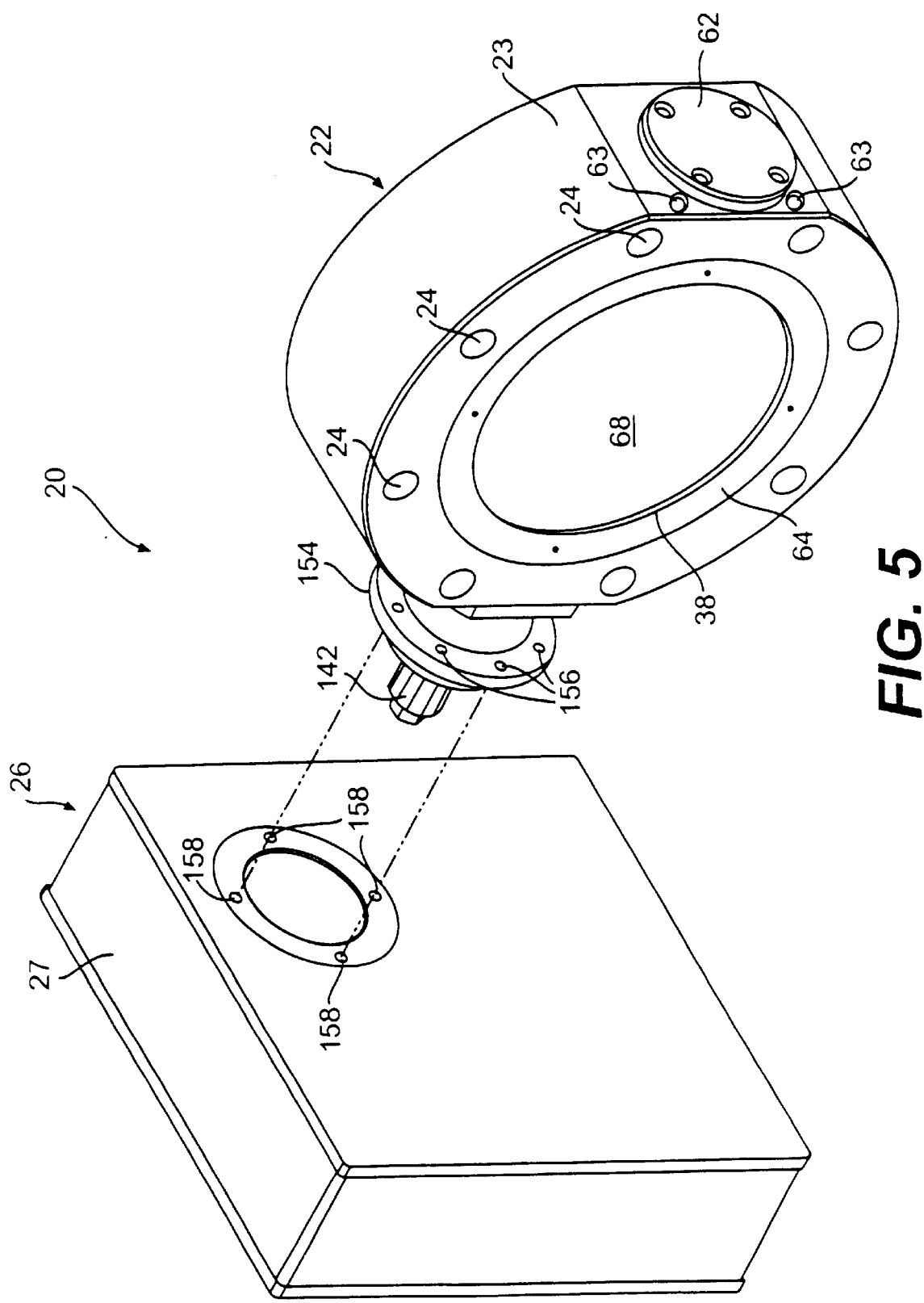
FIG. 5 is a perspective view illustrating the engagement of a valve and a linkage assembly housing according to the present invention.

As illustrated in FIG. 5, a linkage assembly (designated generally as 26) having a housing 27 is engageable with valve 22. Spindle housing 150 includes a flange 154 that has a series of bolt holes 156 that are positioned to engage corresponding bolt holes 158 on housing 27. Preferably, flange 154 includes a series of bolt holes so that the linkage assembly housing may be connected to the valve in several different orientation. The orientation of the linkage assembly housing with relation to the valve may be varied depending on the available space of the pressurized system. In addition, the linkage assembly housing may be oriented to allow easy access to the housing to reset the valve. Preferably, the bolts connecting valve 22 with linkage assembly 26 are configured to allow sealing, with wire or other closure, according to ASME practices to provide evidence of tampering or alteration from 'as-built' condition.

Figure 6A:
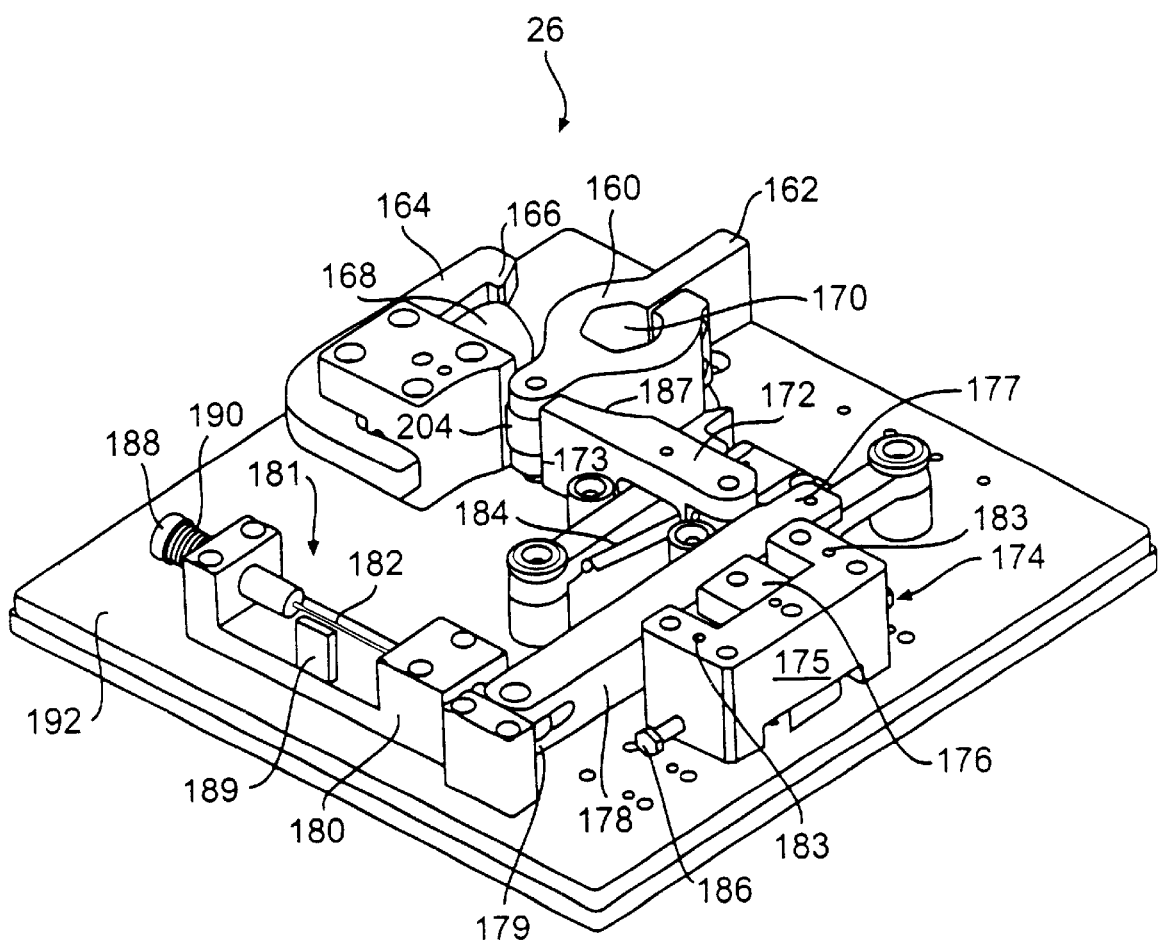
FIG. 6a is a perspective view of a linkage assembly according to the present invention.
Figure 6B:
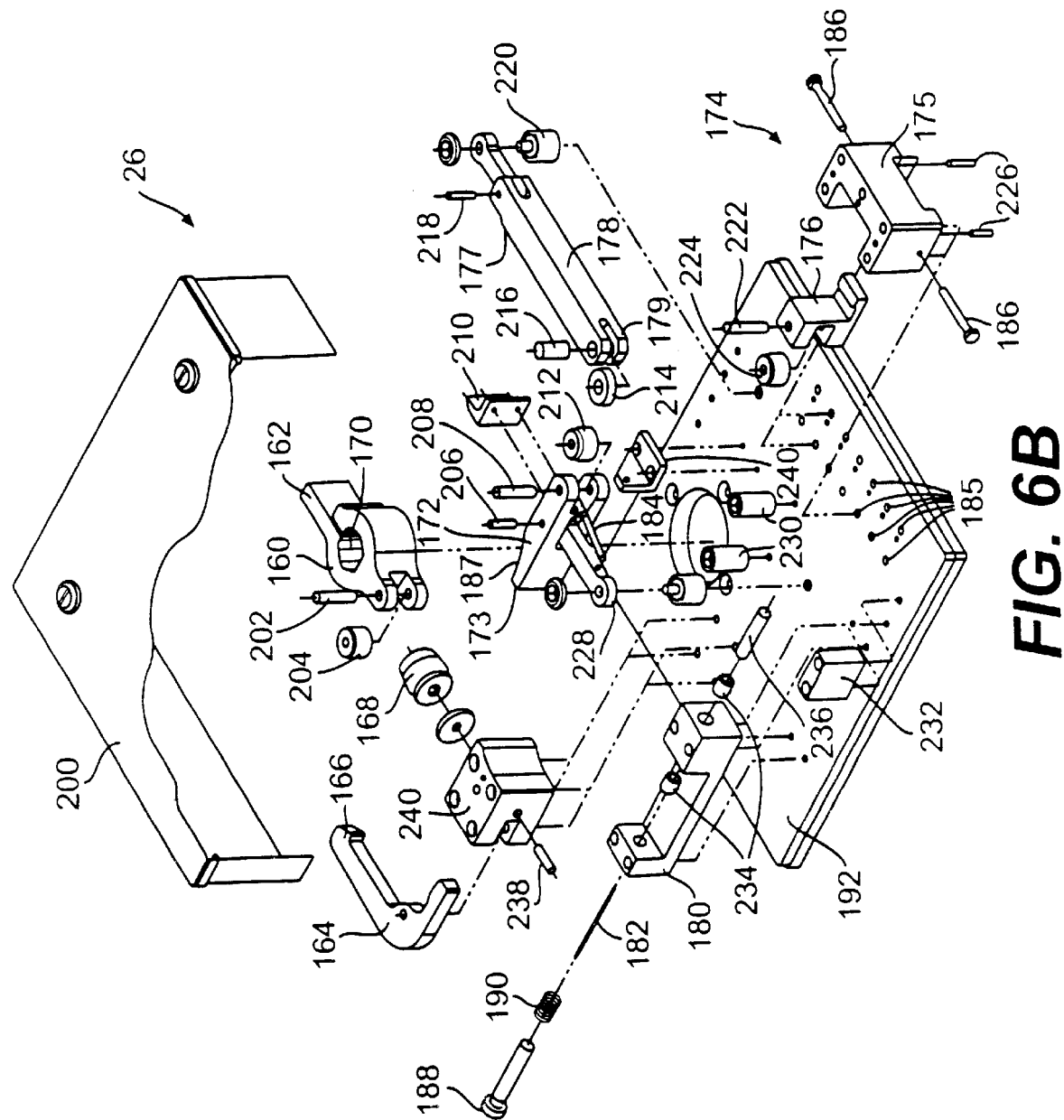

As illustrated in FIGS. 6a and 6b, linkage assembly 26 includes an input arm 160. Input arm 160 has an opening 170 configured to receive spline 142 (referring to FIGS. 4 and 5). The splined connection between spindle 140 and input arm 160 allows the linkage assembly housing to be oriented at a variety of angles with respect to the valve, while retaining a solid coupling between spline 142 and opening 170 so that any rotational movement or torque of spindle 140 is directly transferred to input arm 160.

Input arm 160 is connected to trigger 172. As shown in FIG. 6b, input arm 160 includes a post 202 that rotatably mounts roller 204. Roller 204 engages an end 173 of trigger 172. The connection between roller 204 and trigger end 173 translates any torque applied to the input arm into a substantially linear force on the trigger 172.

Trigger 172 contacts a lever arm 178. Lever arm 178 includes a first end 177 and a second end 179. As shown in FIG. 6b, trigger 172 includes a post 208 that mounts roller 212. Roller 212 contacts first end 177 of the lever arm to transmit the force exerted on the trigger by the input arm against the lever arm.

As illustrated, a fulcrum 174 is disposed adjacent the body of lever arm 178. Fulcrum 174 includes a housing 175 and an adjuster block 176. Adjuster block 176 includes a post 222 that pivotably mounts a roller bearing 224. The surface of roller bearing 224 contacts the body of lever arm 178 and provides a point of support about which the lever arm rotates.

Thus, when the pressurized fluid exerts a torque on shaft 56, the shaft transmits the torque to input arm 160, which exerts a corresponding force on trigger 172. Trigger 172 transmits the force to first end 177 of lever arm 178. Lever arm 178 rotates about fulcrum to 174 to generate an output force acting through second end 179 of lever arm 178. In this manner, the torque exerted on the shaft is translated into an output force.

Preferably, linkage assembly 26 is adjustable during set calibration of the device so that the magnitude of the output force generated by a particular torque may be easily varied. In the preferred embodiment, fulcrum 174 is moveable with respect to lever arm 178 to control the magnitude of the force exerted on release device 181. Even more preferably, the linkage assembly provides for major and minor adjustments of the fulcrum location.

Major adjustments to the fulcrum location are made by adjusting the location of the fulcrum housing with respect to the base plate. As illustrated in FIGS. 6a and 6b, fulcrum housing 175 is connected to a base plate 192 with posts 226. Base plate 192 includes a series of positioning holes 185. Fulcrum housing 175 may be moved relative to lever arm 178 by engaging posts 226 with different sets of positioning holes 185. In the preferred embodiment, positioning holes 185 provide for four different positions of fulcrum housing 175. The number and locations of such positioning holes may vary to provide the desired adjustability to the system.

Preferably, once fulcrum housing 175 is positioned with the proper set of positioning holes 185 to generate the appropriate magnitude of force based on the desired release pressure, the remaining positioning holes 185 are plugged to prevent a user from making major adjustments to the location of fulcrum housing. Alternatively, base plate 192 may be manufactured with only one set of positioning holes to provide one location of the fulcrum housing that will generate the appropriate magnitude of force.

Minor adjustments to the fulcrum housing may be made by adjusting the location of the adjuster block within the fulcrum housing. As illustrated in FIGS. 6a and 6b, fulcrum housing 175 mounts a pair of bolts 186 that fix adjuster block 176 with respect to the fulcrum housing. Adjusting bolts 186 moves adjuster block 176 and bearing 224 relative to lever arm 178. Because bearing 224 may rotate with respect to housing 175, the adjuster block 176 may be easily moved relative to lever arm 178 without disengaging the lever arm from the roller bearing.

Thus, in the preferred embodiment, major adjustments to the location of bearing 224 may be made by adjusting the position of fulcrum housing 175 relative to base plate 192 and minor adjustments may be made by adjusting the location of adjuster block 176 relative to fulcrum housing 175. Moving bearing 224 closer to the first end 177 of lever arm 178 will reduce the magnitude of the output force, where moving bearing closer to the second end 179 of lever arm 178 will increase the magnitude of the output force.

Preferably, housing 175 includes lock pins 183. After the fulcrum has been properly positioned to generate the desired output force based on the input torque of the shaft, lock pins 183 may be engaged with bolts 186 and/or base plate 192 to prevent any further adjustment of the set pressure. This will prevent tampering with the unit to alter the set pressure of the valve.

The present invention also contemplates that a spring, such as a torsion spring (not shown), may be connected to the shaft. The torsion spring may be configured to either increase or decrease the force exerted by the input arm. For example, the torsion spring may be oriented to exert a "preload" force on the shaft, i.e. add to the torque exerted on the shaft by the pressurized fluid. Including the spring will thereby lower the fluid pressure necessary to generate the output force necessary to trigger the release device and open the valve. Once the release device is triggered, the force of the spring will also act to help rotate the plug to the open position. Alternatively, the spring may be oriented to oppose the torque on the shaft. Including the opposing spring will increase the fluid pressure necessary to generate the required output force, since the resistance of the spring adds to the resistance of the release device.

In accordance with the present invention, a release device, or activation component, is connected to the linkage assembly. The release device prevents the shaft from rotating until the output force exceeds a predetermined limit. In the illustrated embodiment, the release device includes a pin that is subject to a compressive force and that buckles according to Euler's Law when the output force reaches the predetermined limit. Such a device is typically termed a "Buckling Pin Non Reclosing Pressure Relief Device." The present invention contemplates, however, that the release device may include a spring, magnet, rupture disk, or any other device that will prevent the shaft from rotating until the output force reaches a predetermined limit. Moreover, as illustrated, the linkage assembly of the illustrated embodiment generates a compressive output force, although it is contemplated that the linkage assembly may generate a tensile or shear output force.

As illustrated in FIGS. 6a and 6b, a release device 181 is connected to linkage assembly 26. In the preferred embodiment, release device 181 includes a buckling pin 182 that is held within a pin housing 180 by a threaded bolt 188 and a pin holder 236. Preferably, a pair of bushings 234 ensure pin holder 236 and buckling pin 182 remain in alignment in pin housing 180. Threaded bolt 188 engages the opposite end of buckling pin 182.

Release device 181 is operatively connected to second end 179 of lever arm 178. As shown in FIG. 6b, second end 179 of lever arm 178 includes a post 216 that mounts a roller bearing 214. Roller bearing 214 contacts pin holder 236. This operative connection transmits the output force exerted by the second end 179 of lever arm 178 to pin holder 236.

Figure 7:
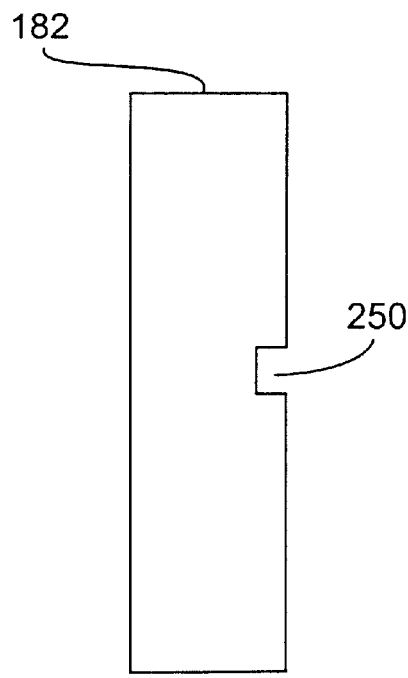
FIG. 7 is a cross-sectional view of a pin having a weakened area in accordance with the present invention.

Buckling pin 182 is configured to withstand a predetermined force. When the output force exceeds the predetermined force, the material of the buckling pin will deform, or buckle. The present invention contemplates that the force at which the pin will deform may be controlled in a number of ways, including, but not limited to, providing pins having different sizes and materials and introducing an area of weakness into the pin. As illustrated in FIG. 7, pin 182 may include a weakened area such as a notch 250. The present invention contemplates that the weakened area may be introduced into the pin by locally scoring, heat treating, etching, or pre-stressing at least a portion of the pin.

The release device may include a magnet, e.g. an electromagnet or a permanent magnet, that prevents the shaft from rotating until the output force reaches the predetermined level. The magnet may be disposed in the release device to prevent the shaft from rotating with either magnetic attraction or magnetic repulsion. It should be noted that the adjustability of the valve of the present invention will allow a low torque/low force design that is particularly conducive to the use of a magnetic release device.

The release device may also include a spring mechanism for opening and/or closing the valve. The spring mechanism may have a tension, compression, torsion, disk, elastomeric, or memory metal spring. The present invention also contemplates that the release device may be a combination of a pin, magnet, or spring.

Figure 10:
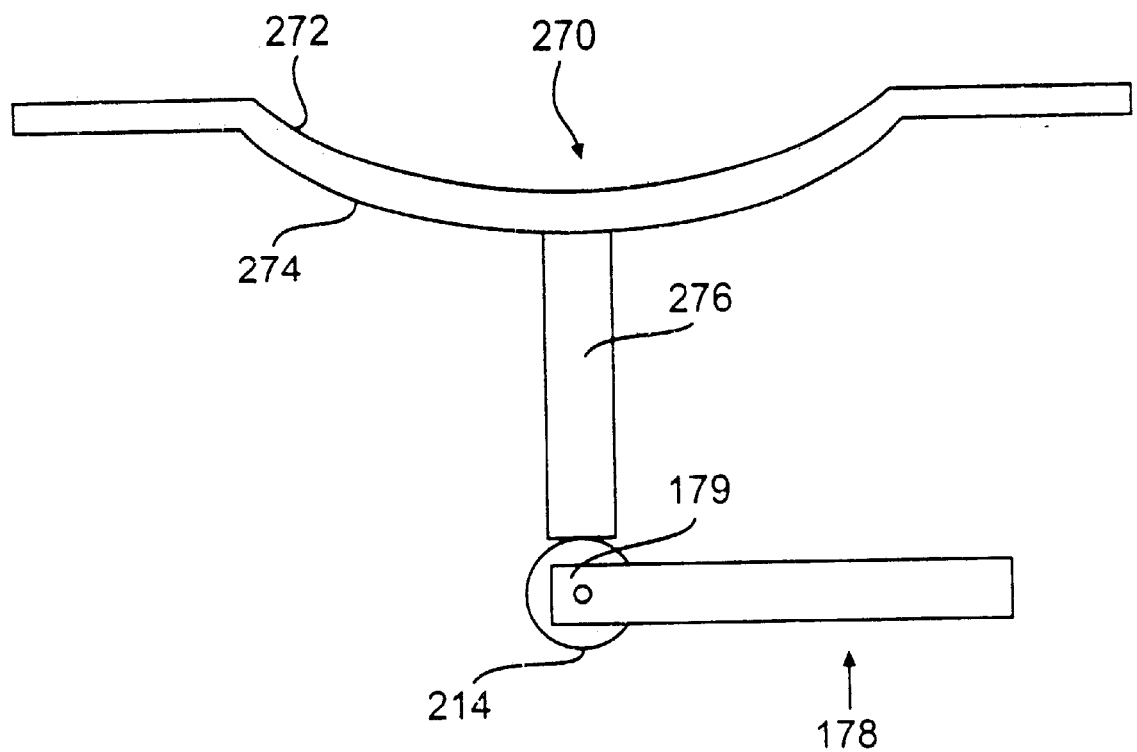
FIG. 10 is a cross-sectional view of a release device including a buckling disk in accordance with the present invention.

In addition, the release device may include a rupture disk, or similar structure, that is configured to deform, rupture, or change shape when a predetermined force is exerted thereon. As illustrated in FIG. 10, a rupture disk 270 includes a dome shaped structure having a concave side 272 and a convex side 274. A rod 276 is disposed between the second end 179 of lever arm 178 and convex side 274 of rupture disk 270. Rod 276 transmits the force of the lever arm onto the rupture disk. The size, shape, and material of the dome-shaped structure is designed so that the rupture disk will withstand a predetermined force. When the force exerted by the lever arm exceeds the predetermined force, the dome-shaped structure will buckle and allow the lever arm to move, thereby releasing the shaft. While the illustrated embodiment depicts a reverse-buckling rupture disk, the present invention contemplates that the rupture disk may also be a tension-loaded disk, where rod 276 contacts concave side 272. In addition, it is contemplated that the rupture disk may be a flat membrane constructed of a material such as carbon graphite.

It is contemplated that the release device may include a command release mechanism that will allow the valve to open regardless of the fluid pressure. Preferably, the command release mechanism is a solenoid-based or pyrotechnic-based actuator that deforms the pin, upon command, to trigger the release device. Alternatively, the command release mechanism may be a device that ensures that an output force sufficient to trigger the release mechanism is generated, such as an actuator that acts on the lever arm or shaft.

In accordance with the present invention, the release device may include a fusible alloy that liquefies when exposed to heat. Including the fusible alloy in the release device will ensure that the valve opens if a fire or other emergency situation occurs in the proximity of the valve. In addition, the fusible alloy may be disposed adjacent a controllable source of heat so that an operator may heat the alloy to open the valve on demand, should an emergency situation develop elsewhere in the pressurized system. Thus, the present invention contemplates that the fusible alloy may be integrated into the release device to cause the valve to open in response to heat generated by a heating element (on demand), in response to heat generated by an emergency situation, in response to an over-pressure situation, or any combination thereof.

The fusible alloy may be included as part of the pin or as part of the pin holder so that exposure to heat will liquefy the fusible alloy and cause the pin to deform or allow the pin to move, thereby releasing the lever arm and allowing the plug to open. Preferably, the fusible alloy is eutectic to provide a single temperature set point at which the valve will release, although the present invention contemplates that non-eutectic fusible alloys may also be used.

Figure 8:
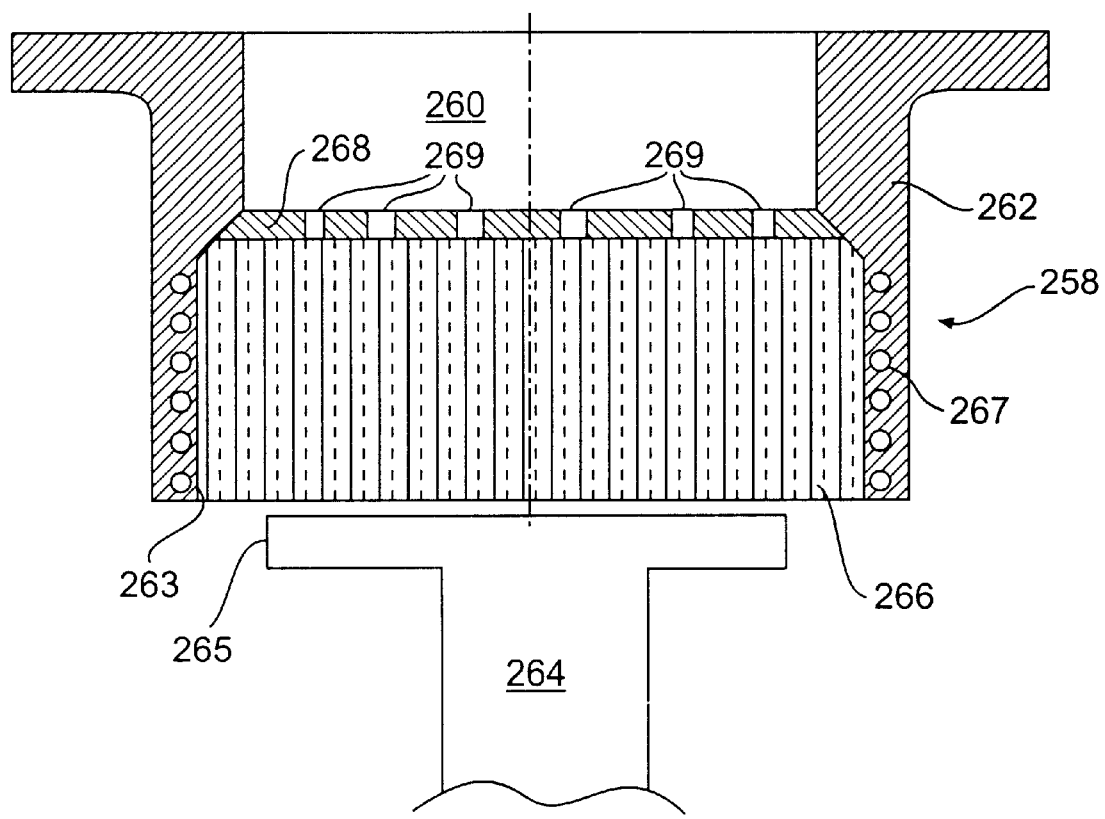
FIG. 8 is a cross-sectional view of a fusible plug in accordance with the present invention.

In one embodiment, the release device includes a fusible plug 258, as illustrated in FIG. 8. Fusible plug 258 includes a housing 262 having an opening 263 that contains a fusible alloy 266. A support plate 268 that includes a series of perforations 269 is disposed on one side of fusible alloy 266. Support plate 268 may be integral with housing 262 or a separate piece that mates with housing 262.

The release device also includes a piston 264 that is operably connected to second end 179 of lever arm 178 (referring to FIGS. 6a and 6b). Piston 264 engages fusible alloy 266, which prevents piston 264 and, thus, lever arm 178 from moving. When the temperature of housing reaches a certain level, fusible alloy 266 liquefies. The liquefied fusible alloy 266 flows through perforations 269 or around the outer diameter 265 of piston 264, thereby allowing piston 264 to move. Movement of the piston allows the lever arm to move and ultimately release the shaft to allow the plug to rotate to the open position. In this manner, the valve may be opened when the temperature reaches a predetermined level.

The present invention also contemplates that a heating coil 267 or other heat generating device may be disposed in plug housing 262. Preferably, the heating coil is remotely operated to allow an operator, or an automated control system, to activate the heating coil and heat the fusible alloy to open the valve when an emergency situation occurs elsewhere in the system. this is particularly beneficial in large pressurized systems where the fusible alloy will not necessarily be subject to direct heating by a fire or other dangerous condition.

Figure 9:
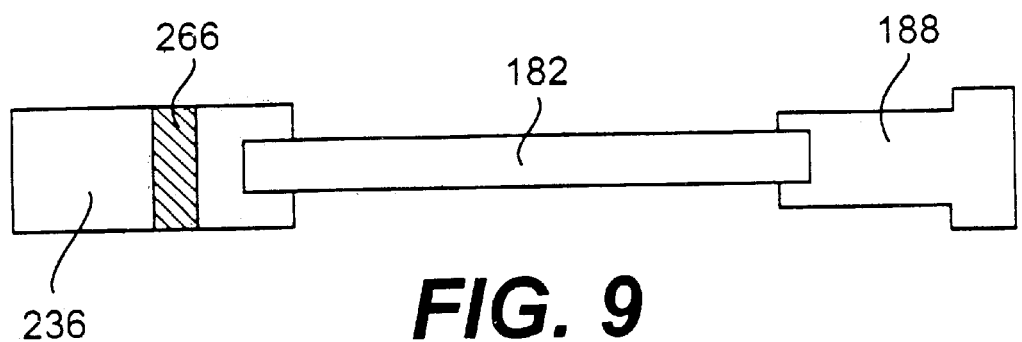
FIG. 9 is a cross-sectional view of a release device including a buckling pin and a fusible alloy in accordance with the present invention.

In the embodiment of the release device illustrated in FIG. 9, a fusible alloy 266 is included as part of pin holder 236. In this embodiment, the release device will release the shaft if the temperature of the fusible alloy reaches a certain temperature or if the force exerted on the pin exceeds the material strength of the pin. Thus, this embodiment will provide a pressure relief in either an over-pressure or an over-temperature condition.

As discussed above, the fulcrum of the present invention may be easily adjusted to vary the magnitude of the output force generated by a given fluid pressure and exerted on the release device. This provides increased flexibility for the pressure relief apparatus. For example, if the release device includes a buckling pin configured to deform at a certain force, the fluid pressure that will generate an output force sufficient to deform the pin may be varied by merely adjusting the location of the fulcrum relative to the lever arm. If a lower release pressure is desired, the fulcrum is moved towards the second end of the lever arm. Similarly, if a greater release pressure is desired, the fulcrum may be moved closer to the first end of the lever arm.

This adjustability feature is advantageous for many reasons. It allows for standardization of parts, thereby easing manufacturing and inventory controls. The system can also be adjusted in the field if performance requirements for the installation are changed. The design allows for the compact offset valve design to handle a range of pressures. For example, an 8" unit valve according to the present invention can handle pressures ranging from about 5 psi to about 300 psi, whereas a conventional 8" rotatable device could be expected to handle pressures ranging from about 5 psi to about 50 psi.

Preferably, as illustrated in FIGS. 6a and 6b, trigger 172 includes a curved surface 187 proximate end 173 of trigger 172 and trigger 172 is pivotally mounted to link 228 by a post 206. When buckling pin 182 deforms in response to the output force, lever arm 178 is allowed to pivot about fulcrum 174 so that second end 179 and first end 177 of lever arm 178 move in opposite directions. Movement of first end 177 of lever arm 178 removes support for trigger 172. In response to the continued force of input arm, trigger 172 pivots about post 206 and roller 204 of input arm 160 disengages from end 173 of 172. Thus, input arm 160 begin a rotational movement to allow the shaft and plug to rotate to the open position. Curved surface 187 of trigger 172 provides clearance for input arm 160 to rotate through its full course of movement.

Preferably, a small rotation of input arm 160 of approximately 1° will allow roller 204 to disengage end 173 of trigger 172 and open the valve. Thus, the release device need only allow a small movement of the lever arm in order to release the valve. This feature provides for the use of a re-useable pin. For example, a relatively long buckling pin may be placed in the pin holder. When the pressure in the system creates a sufficiently high output force, the pin will start to elastically deform prior to buckling. The elastic deformation will shorten the pin sufficiently to allow the small degree (approximately 1°) of rotation to open the valve. The device may then be reset to reuse the same pin. The system may then be pressurized and the pin re-used.

As illustrated in FIGS. 6a and 6b, a tension spring 184 preferably connects trigger 172 to link 228. Tension spring 184 acts on trigger 172 to move the trigger back to its original position to realign the trigger with lever arm 178 when input arm 160 is rotated back to its starting position to reset the device.

In the preferred embodiment, a latch is provided to engage the input arm of the linkage assembly when the plug rotates to the open position. The latch holds the plug in the open position. Preferably, the latch includes an energy absorber to absorb the energy of the input arm contacting the latch. The hollow plug of the present invention provides for inertia reduction that lessens the necessary shock absorber.

As illustrated in FIGS. 6a and 6b, a latch 164 is pivotably disposed in a latch housing 240. Latch 164 includes a notch 166 configured to engage a projection 162 on input arm 160. Preferably, a spring 238 acts on latch 164 to urge the latch 164 into a latched position. When input arm 160 rotates to the open position, projection 162 contacts latch 164 and pivots latch 164. When projection has engaged notch 166, spring 238 returns latch to the latched position to prevent input arm 160 from rotating back to the closed position.

Preferably, an energy absorber 168 is positioned on latch housing 240. Projection 162 of input arm 160 contacts energy absorber when input arm moves to the open position. Energy absorber 168 is made of a resilient material that flexes when contacted by projection 162. The present invention contemplates that the energy absorber may also be a damper mechanism, such as a hydraulic shock absorber, pneumatic shock absorber, or cam mechanism that acts on the shaft to slow the rotation of the shaft.

After the energy created by the contact of the projection with the energy absorber is dissipated, energy absorber 168 returns to its original shape and locks projection 162 against notch 166. Projection 162 may be freed from notch 166 by manually pivoting latch 164 to release projection 162 of input arm 160 and return input arm to its starting position. It is contemplated that a mechanism for releasing the latch may be included to release the latch and allow the plug to return to the closed position when the pressure of the fluid has been reduced to a safe level.

It should be noted that the pressure relief apparatus of the present invention may also be used for two-way pressure relief. In this embodiment, a second linkage assembly could be connected to the shaft and adapted to prevent the shaft from rotating in the opposite direction. Because the linkage assemblies are separately adjustable, the pressure at which the valve opens could be independently controlled for each direction. Thus, the valve would open when the fluid pressure on one side of the valve reached a first level and would also open when the pressure on the other side of the valve reached a second level, thereby providing pressure relief in both directions.

The operation of the aforementioned pressure relief apparatus will now be described with reference to the attached drawings.

Referring to FIG. 1, valve 22 of the pressure relief apparatus 20 is engaged with a pipe flange of a pressurized system by engaging bolts through bolt holes 24 and the corresponding bolt holes of the system flange. Operation of the pressurized system directs pressurized fluid into fluid inlet 52 of body 23. Referring to FIG. 2, the pressurized fluid exerts a force on inlet plate 68 of plug 65. Because the rotational axis of the plug is offset from the center of the plug, the resultant force exerted by the pressurized fluid on inlet plate 68 creates a moment about the rotational axis of the plug and exerts a torque on shaft 56.

The torque on shaft 56 is translated through spindle 140 to input arm 160 of linkage assembly 26 (referring to FIGS. 6a and 6b). The torque on input arm 160 is translated into a linear force on trigger 172. Trigger 172 transfers the linear force onto lever arm 178, which exerts a corresponding force on release device 181.

When the force exerted on buckling pin 182 exceeds the strength of the material, buckling pin 182 deforms, or buckles, to trigger the release of the valve. Preferably, in the reclosing embodiment of the present invention, the valve is triggered within ±3% of the set pressure. The deformation of buckling pin 182 releases lever arm 178, which, in turn, releases trigger 172. Release of trigger 172 frees input arm 160 and allows shaft 56 and plug 65 to rotate.

The pressurized fluid continues to exert a force on inlet plate 68 of plug 65 causing plug 65 to rotate towards the open position. As described previously, seal 84 remains engaged with inlet plate 68 for several degrees of the rotation of plug 65. After the plug rotates through that first portion of the rotation and the seal with the body is broken, fluid is allowed to escape from the system through valve outlet 54. When plug 65 rotates to the open position, passageways 72 become substantially aligned with the flow of fluid. Thus, the plug of the present invention provides a large flowpath through which fluid may escape, thereby providing an efficient flowpath with a low coefficient of resistance.

As plug 65 rotates within body 23, input arm 160 follows a corresponding rotation. When plug 65 reaches the open position, projection 162 strikes energy absorber 168, which helps dissipate the energy of the valve opening. The energy created by the opening of the valve is further reduced by the existence of passageways 72 in plug 65. These "hollow" areas of the plug reduce the mass of the plug and, thus, the inertia generated by the moving plug. Since the inertia is lower, the force of the impact on energy absorber 168 is also reduced. This reduces the wear on the pressure relief apparatus and will reduce maintenance and repair of the apparatus.

In addition, projection 162 engages latch 164. Latch 164 prevents plug 65 from any reverse rotation, which could potentially obstruct the fluid release. Preferably, latch 164 is configured to hold plug 65 such that passageways 72 are properly aligned with fluid flowpath 50.

After the fluid has vented from the system and the pressure reduced, the pressure relief apparatus may be reset. This is accomplished by releasing latch 164 and returning input arm 162 to the starting position. It is contemplated that the present invention be practiced without a latch, in which case, gravity may act on the plug to return the plug to a closed position. There are potential advantages of having the valve close even without reseating the seal.

It is contemplated that the reclosing valve of the present invention may include an appropriate mechanism, such as a pilot style spring loaded mechanism or a shaft mounted spring loaded mechanism, to automatically reclose the valve when the pressure in the system drops below approximately 95% of the set pressure. Preferably, the valve recloses in accordance with ASME Section VIII. As such, the seal would actually reseat.

A wrench or socket may be engaged with drive 143 to aid in returning the plug to a closed position. When plug 65 is returned to the starting position, outer perimeter 95 of inlet plate 68 engages projections 120 and 122 of seal 84. The curved cross-sectional shape of the outer perimeter 95 allows the seal to be easily engaged with the plug. Thus, the seal of the present invention can be energized with a relatively low-torque.

After seal 84 is energized with plug 65, release device 181 may be reset. Buckling pin 182 may be replaced by removing threaded bolt 188 and inserting a new buckling pin 182 into pin holder 192. Threaded bolt 188 is then tightened to clamp the new buckling pin in place and the reset of the apparatus is complete.

It will be apparent to those skilled in the art that various modifications and variations can be made in the assembly of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pressure relief apparatus for a system containing a pressurized fluid, comprising:

a valve having a body defining a fluid flowpath, a shaft rotatably disposed in the body and having an exterior end extending through the body, and a plug mounted on the shaft, the body engageable with the system to expose the plug to the pressurized fluid, the pressurized fluid acting on the plug to exert a torque on the shaft and rotate the plug from a closed position to an open position;

an input arm engageable with the exterior end of the shaft;

a linkage assembly having a fulcrum, a lever arm having a first end and a second end, and a trigger disposed between the input arm and the first end of the lever arm, the input arm acting through the trigger on the first end of the lever arm to pivot the lever arm about the fulcrum to generate an output force based upon the torque exerted on the shaft;

a release device operatively connected to the linkage assembly to prevent the shaft from rotating, the release device including a housing holding a fusible alloy configured to liquefy and allow the shaft to rotate when the temperature of the alloy exceeds a predetermined limit; and a heating element disposed in the housing adjacent the fusible alloy, the heating element operable to raise the temperature of the fusible alloy to the predetermined limit to release the shaft.

2. The apparatus of claim 1, wherein the linkage assembly is adjustable to vary the magnitude of the output force corresponding to a particular shaft torque.

3. The apparatus of claim 1, wherein the release device includes a pin disposed in a pin holder, the pin configured to deform and allow the shaft to rotate when the output force exceeds a predetermined limit.

4. The apparatus of claim 3, wherein the pin holder includes a seat supporting an end of the pin, the seat containing the fusible alloy and configured to allow the pin to move and release the shaft when the temperature of the alloy reaches the predetermined limit.

5. A method of releasing fluid from a system containing a pressurized fluid, comprising:

engaging a valve having a plug rotatably mounted on a shaft with the system to expose the plug to the pressurized fluid such that the pressurized fluid acts on the plug to exert a torque on the shaft;

translating the torque exerted on the shaft into an output force with a linkage assembly having a lever arm supported by a fulcrum;

exerting the output force on a release device having a deformable pin and a fusible alloy configured to prevent the shaft from rotating;

adjusting the position of the fulcrum in the linkage assembly to vary the magnitude of the output force; and activating a heating element disposed in a housing holding the fusible alloy to increase the temperature of the fusible alloy to liquefy the fusible alloy and allow the shaft to rotate, thereby opening the valve.

6. The method of claim 5, wherein the deformable pin deforms to allow the shaft to rotate when the torque exerted on the shaft by the pressurized fluid reaches a predetermined limit.

7. The method of claim 5, wherein the heating element is remotely activated.

8. A pressure relief apparatus for a system containing a pressurized fluid, comprising:

a valve having a body defining a fluid flowpath, a shaft rotatably disposed in the body and having an exterior end extending through the body, and a plug mounted on the shaft, the body engageable with the system to expose the plug to the pressurized fluid, the pressurized fluid acting on the plug to exert a torque on the shaft and rotate the plug from a closed position to an open position;

an input arm engageable with the exterior end of the shaft;

a linkage assembly having a fulcrum, a lever arm having a first end and a second end, and a trigger disposed between the input arm and the first end of the lever arm, the input arm acting through the trigger on the first end of the lever arm to pivot the lever arm about the fulcrum to generate an output force based upon the torque exerted on the shaft; and a release device operatively connected to the linkage assembly to prevent the shaft from rotating, the release device including a housing holding a fusible alloy configured to liquefy and allow the shaft to rotate when the temperature of the alloy exceeds a predetermined limit.

* * * * *